United States Patent [19]
Dahl

[11] Patent Number: 5,801,691
[45] Date of Patent: Sep. 1, 1998

[54] METHOD AND APPARATUS FOR MOBILE DEVICE SCREEN REFORMATTING UTILIZING HYPERTEXT

[75] Inventor: Scott S. Dahl, Rochester, Minn.

[73] Assignee: International Business Machines Corporation, Armonk, N.Y.

[21] Appl. No.: 777,896

[22] Filed: Dec. 31, 1996

[51] Int. Cl.$^6$ .................................................. G06F 3/00
[52] U.S. Cl. ........................................ 345/339; 707/507
[58] Field of Search .............................. 345/342, 112, 345/118, 127; 707/518–521, 525, 507, 508, 501

[56] References Cited

U.S. PATENT DOCUMENTS

| | | | |
|---|---|---|---|
| 4,651,288 | 3/1987 | Zeising | 395/117 |
| 5,001,697 | 11/1991 | Torres | 345/439 |
| 5,155,836 | 10/1992 | Jordan et al. | |
| 5,283,560 | 2/1994 | Bartlett | |
| 5,313,229 | 5/1994 | Gilligan et al. | |
| 5,335,323 | 8/1994 | Kolnick | |
| 5,374,942 | 12/1994 | Gilligan | |
| 5,404,442 | 4/1995 | Foster et al. | |
| 5,481,741 | 1/1996 | McKaskle et al. | |
| 5,682,529 | 10/1997 | Hendry et al. | 395/653 |

OTHER PUBLICATIONS

Grehan, R., "Vibe Jive," BYTE, v. 22, N. 9 pp. 89–90, Sep. 1997.

Luders, P., "An Approach to automatic display layout . . . ", Software: Practice and Experience, v. 25, Nov. '95 pp. 1183–1202.

Stinson, C., "Stinson's favorite socfrets: ten best tips of all time," PC Computing, v. 6, No. 10, 1993 p. 304(3).

*Primary Examiner*—A. Katbab
*Attorney, Agent, or Firm*—Andrew J. Dillon

[57] ABSTRACT

The present invention is directed to an improved mobile data processing device and a method of operating a mobile data processing device. The mobile data processing device includes a relatively small display screen. The present invention utilization by the mobile data processing device of an application which includes a plurality of screens which have been written for use in a data processing system having a relatively large display screen. When the application is loaded into the mobile data processing device and started, at least a portion of a particular one of the plurality of screens of the application is displayed on the relatively small display screen of the mobile data processing device, Next, the mobile data processing device is utilized to determine whether or not display items from said particular one of said plurality of screens are not fully displayed within said relatively small display screen of said mobile data processing device. If it is determined that said display items from said particular one of said plurality of screens are not fully displayed within said relatively small display screen of said mobile data processing device, then said mobile data processing device automatically generates a substitute screen for said particular one of said plurality of screens in said application. The substitute screen relocates said display items to render them visible on said relatively small display screen of said mobile data processing device

13 Claims, 10 Drawing Sheets

FIELD SEQUENCE TABLE — 252

| | | |
|---|---|---|
| 1 | FIELD A | D1,D2 |
| 2 | FIELD G | D1,D2 |
| 3 | FIELD B | D1,D2 |
| 4 | FIELD X | D1,D2 |
| 5 | FIELD J | D1,D2 |
| ... | | |
| N | FIELD N | D1,D2 |

SCREEN CATALOG — 262

SCREEN
A1
M3
X4
G7
P4
...

METHOD AND APPARATUS FOR MOBILE DEVICE SCREEN REFORMATTING UTILIZING HYPERTEXT

BACKGROUND OF THE INVENTION

1. Field of the Invention

The present invention relates in general to mobile computing devices, and in particular to "palmtop" mobile computing devices or other small data processing devices such as bar code reader devices.

2. Description of the Prior Art

Most desktop and laptop data processing systems include relatively large displays. Consequently, most software applications are typically written for a 24 by 80 character screen. However, the recent emergence of handheld mobile data processing devices (such as "palmtop" computers and bar code reader devices) has resulted in a far smaller display area. These handheld mobile data processing devices attempt to minimize the weight of the device, to maximize power conservation in operation of the device, and to reduce the size of the mobile data processing device display screen in order to allow the device to fit in the palm of a person's hand. Unfortunately, this compromise leads to a great reduction in the display space available for use by the software programs.

As new handheld mobile data processing or computing devices are developed, there is a considerable lag in time until the software applications have been modified by the software developers from a 24 by 80 character screen to a smaller screen, such as a 16 by 16 character display. Unfortunately, this leads to the requirement of dual support for both the full-sized display and a reduced-sized display.

SUMMARY OF THE INVENTION

It is one objective of the present invention to provide an improved mobile data processing device and method of operating a mobile data processing device which generates substitute screens for particular ones of a plurality of screens associated with an application. The method and apparatus of the present invention is particularly useful in applications which include a plurality of field elements which have been arranged and ordered for appearance in a data processing system having a relatively large display screen. The present invention is advantageous over the prior art in that it does not require the use of special utility programs or trained developers to capture screen data and rearrange the screens to fit a particular mobile display device. Additionally, this solution is flexible and allows the end user to arrange the screen information to his/her preference. Finally, the present invention is advantageous over the prior art in that it is adaptable to any sized display screen, and is thus a solution which is not machine-dependent.

These and other objectives are achieved as is now described. The present invention is directed to an improved mobile data processing device and a method of operating a mobile data processing device. The mobile data processing device includes a relatively small display screen. The present invention facilities utilization by the mobile data processing device of an application which includes a plurality of screens which have been written for use in a data processing system having a relatively large display screen. When the application is loaded into the mobile data processing device and started, at least a portion of a particular one of the plurality of screens of the application is displayed on the relatively small display screen of the mobile data processing device. Next, the mobile data processing device is utilized to determine whether or not display items from said particular one of said plurality of screens are not fully displayed within said relatively small display screen of said mobile data processing device. If it is determined that said display items from said particular one of said plurality of screens are not fully displayed within said relatively small display screen of said mobile data processing device, then said mobile data processing device automatically generates a substitute screen for said particular one of said plurality of screens in said application. The substitute screen relocates said display items to render them visible on said relatively small display screen of said mobile data processing device. Preferably, the items are rearranged and "clustered" (that is, closely spaced within said relatively small display screen of said mobile data processing device). Additionally, particular fields of said display items are converted from a full-text display status to a hypertext display status. In accordance with the present invention, there are generally two types of display items included in a display: informational display items, and data entry display items. The informational display items provide orienting information, or identify a particular type of data in an adjacent field, or serve the function of prompting the user for the making of choices or the entry of data. In accordance with the preferred embodiment of the present invention, particular informational display items are converted from a full-text display status to a hypertext display status, while the particular data entry display areas and any data contained therein are maintained in a full-text display status. In accordance with the present invention, the mobile data processing device is utilized to automatically switch the particular informational display items between a hypertext display status and a full-text display status upon occurrence of any of the following: (1) said application determines that a user prompt for a particular informational display item is required, and (2) said application determines that particular predetermined operator input has occurred. In accordance with the preferred embodiment of the present invention, the particular predetermined operator input may comprise: (1) operator location of a cursor on said particular informational display item, or (2) operator location of a graphical pointing device on said particular informational display item. Also, in accordance with the present invention, the mobile data processing device is also utilized for automatically switching said particular informational display item between a full-text display status and a hypertext display status upon occurrence of yet another predetermined event. In the preferred embodiment of the present invention, the event may constitute the application's determination that another and different user prompt for another and different informational display item is required. Alternatively, the application may determine that a particular predetermined operator input has occurred. Thereafter, when the particular one of the plurality of screens is called for display, the mobile data processing device utilizes the substitute screen for the particular one of the plurality of screens of the application. The substitute screen relocates the display of items to render them visible on the relatively small display screen of the mobile data processing device. Preferably, this process is repeated for each particular screen which is called for display by the mobile data processing device. Preferably, the mobile data processing device generates a record (or catalog) of the particular ones of the plurality of screens of the application for which a substitute screen exists. Thereafter, anytime any particular screen for which a substitute screen exists is called for display by the mobile data processing device, the substitute screen is generated and displayed in the relatively small display of the mobile data processing device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
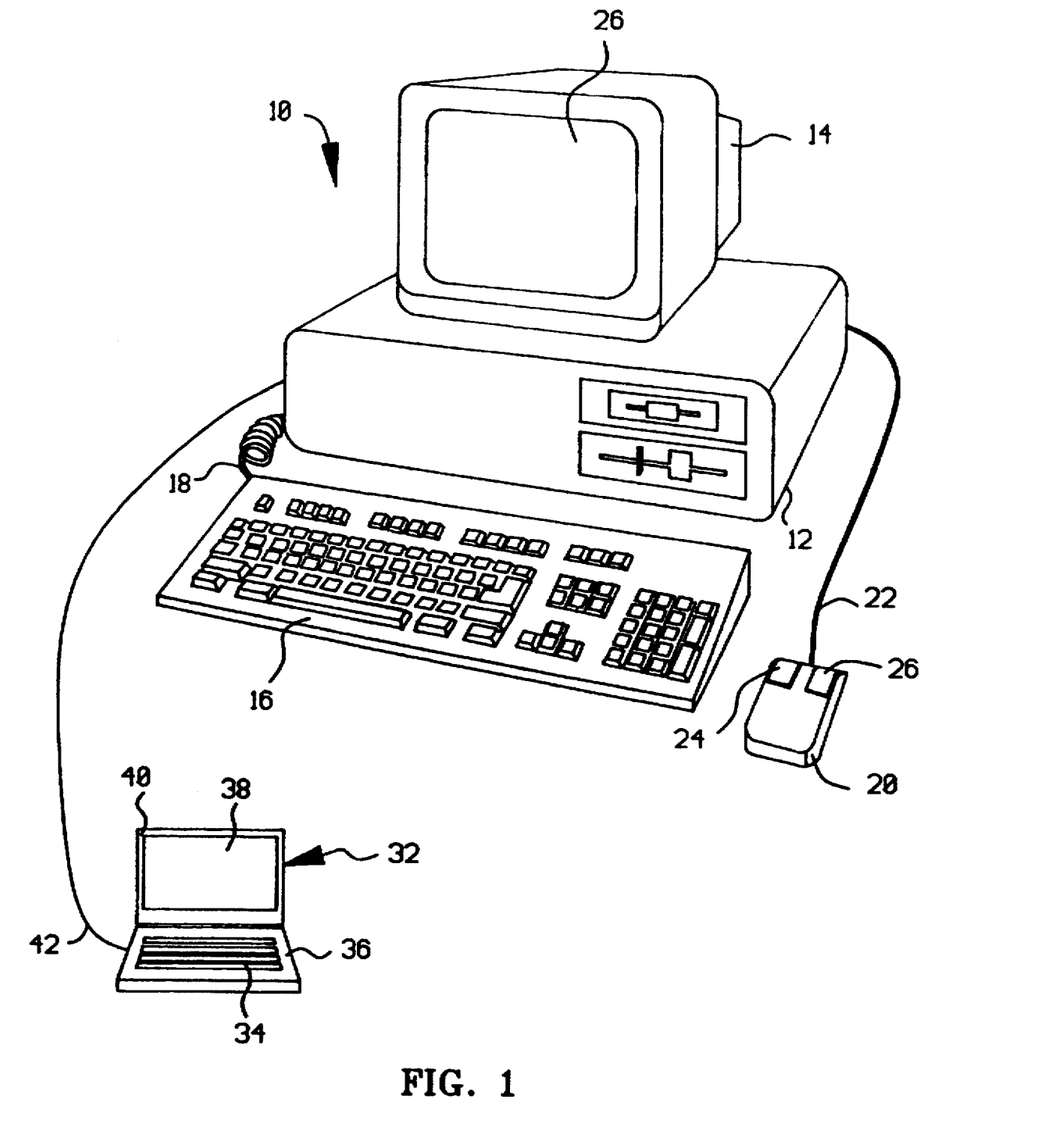
FIG. 1 is a pictorial representation of a desktop data processing system which includes a relatively large display screen, and a mobile data processing device which includes a relatively small display screen.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as those manufactured by International Business Machines Corporation.

As is clearly shown in FIG. 1, display 14 includes a relatively large video display which is utilized to display the screens and user interfaces for the various applications which are run by data processing system 10. Display 14 typically includes a 24 by 80 character screen format, which is the de facto standard for most applications currently available for data processing system 10. Mobile data processing device 32 is a so-called "palmtop" device which includes a central processing unit, memory, and applications which are executed by the mobile data processing device. Typically, mobile data processing device 32 includes a keypad or keyboard 34 on a lower portion 36 of a housing, and display 38 on an upper portion 40 of a housing. Typically, the two halves of the housing can be folded together to make this device a relatively slimline device which can be carried in a jacket pocket, purse, or briefcase with ease. As is shown in FIG. 1, mobile data processing device 32 includes a relatively small display 38. The mobile data processing devices which are currently available in the marketplace have a variety of sizes of displays. One exemplary size is a 16 by 16 character display. Obviously, the 16 by 16 character display is not adequate in size to accommodate the screens of applications which are suitable for execution by data processing system 10. However, mobile data processing device 32 has sufficient processing power and memory in order to execute such applications. The present invention is directed to a method and apparatus which allows mobile data processing device 32 to execute applications which are written for the relatively large display of data processing system 10 without requiring special utility programs or trained developers to develop software for the smaller device. This solution of the present invention is flexible and allows the end user to arrange the screen information to his/her own personal preference. Furthermore, the method and apparatus of the present invention allows the end user to adapt the application to any particular sized device. Mobile data processing device may be coupled through bus 42 to data processing device 10 to allow for the exchange of programs and data.

Figure 2:
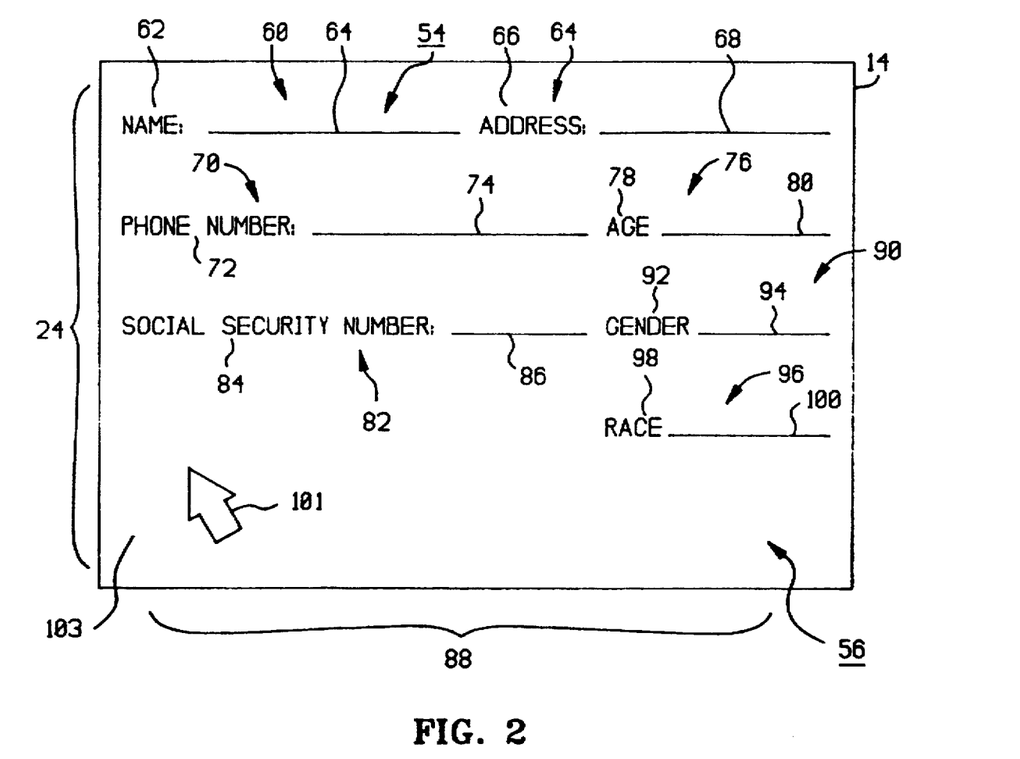
FIG. 2 depicts a particular display screen of an application which may be viewed in its entirety on the relatively large display of the desktop data processing device of FIG. 1.

FIG. 2 is a pictorial representation of a particular one of a plurality of screens of an application which is executable by both data processing system 10 (of FIG. 1) and mobile data processing device 32 (of FIG. 1). As is shown, the width of the screen is approximately 80 characters long, as is conventional. The length of the screen is 24 characters long, also as is conventional. The screen 54, which is depicted within display 14, includes a plurality of display items 56, which are arranged in particular locations within screen 54. As is shown FIG. 2, screen 54 includes a plurality of display items 56, such as: name item 60, which includes an informational display item ("NAME") 62, and a data entry display area 64; an address display item 66, which includes an informational display item ("ADDRESS") 64, and a data entry display area 68; a telephone number display item 70, which includes an informational display item ("PHONE NUMBER") 72, and a data entry display area 74; an age display item 76, which includes an informational display item ("AGE") 78, and a data entry display area 80; a social security number display item 82, which includes an informational display item ("SOCIAL SECURITY NUMBER") 84, and a data entry display area 86; a gender display item 90, which includes an informational display item ("GENDER") 92, and a data entry display area 94; a race display item 96, which includes an informational display item ("RACE") 98, and a data entry display area 100. The particular display items depicted in FIG. 2 are merely exemplary. The present invention may be utilized in a variety of applications which require different types of data than the display items depicted in FIG. 2. What the display items in FIG. 2 have in common is that part of each display item includes some identifying or informational material, such as the textual components which identify the various fields of screen 54. Since display 14 of FIG. 2 is a relatively large display area, there is no problem in accommodating all of the informational display items and the data entry display items within a single screen; however, when a relatively small display area is utilized, it will be impossible for the display items to be depicted in the format of FIG. 2. In accordance with the present invention, the display items are regrouped to render them visible in the relatively small display screen of the mobile data processing device 32 (of FIG. 1).

Figure 3:
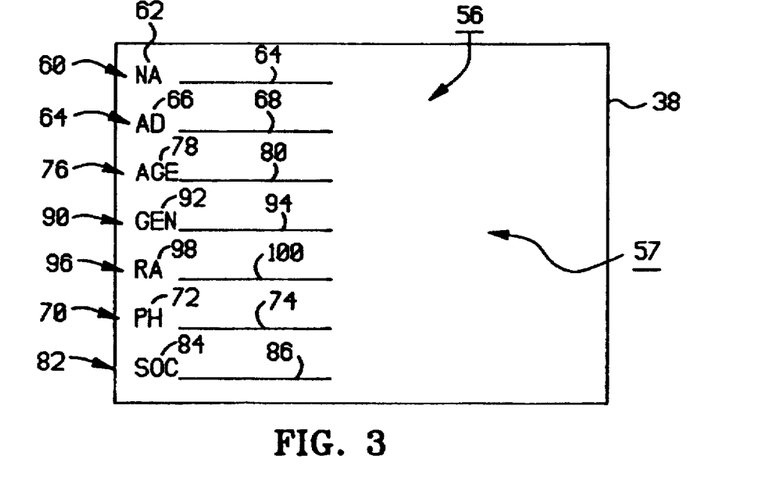
FIG. 3 depicts the relatively small display screen of the mobile data processing device which displays a substitute screen for the screen of FIG. 2.

FIG. 3 depicts the relatively small display screen 38 of the mobile data processing device 32 (of FIG. 1) which displays a substitute screen 57. In accordance with the present invention, which has the display items 56 rear-ranged within relatively small display area 38 so that they are clustered together to minimize the amount of space utilized to display all of the display items 56. Additionally, particular portions of the display items 56 are displayed in a hypertext mode. In the hypertext mode, only a portion of a display item is visible in relatively small display screen 38. Predetermined program action and/or operator action will cause the hypertext items to be displayed in a full-text model, for a predetermined interval. Thereafter, the particular display items are returned to a hypertext display model. The objective of the present invention is to allow the relatively small display screen 38 to be utilized to display the useful and necessary information therein, while utilizing clustering and hypertext formatting in order to minimize the use of space within the display area by items which do not have the same importance as the display items which are displayed in a full-text mode.

As is depicted in FIG. 3, name display item 60 is substantially maintained in its original position. However, address display item 64 is relocated within display screen 38. Additionally, age display item 76, gender display item 90, and race display item 96, are also relocated within display screen 38. As is shown in FIG. 3, telephone number display item 70 and social security number display item 82 are also slightly relocated within display area 38 in order to accommodate the relocation of the other items. In this particular format, all of the display items 56 are relatively closely clustered to one another in order to minimize-he amount of screen area utilized to display those items. In accordance with the present invention, particular ones of display items 56 are displayed in a hypertext mode or status in order to further economize the use of display space within relatively small display screen 38. For example, informational display item 62 of name display item 60 is displayed within relatively small display screen 38 in a hypertext mode ("NA"). The informational display item 66 of address display item 64 is also shown within relatively small display screen 38 in a hypertext mode ("AD"). The informational display item 78 of age display item ("AGE") 76 is not depicted in a hypertext mode, since the text is relatively short in comparison with the other textual components of display items 56. As is shown, informational display item ("GEN") 92 of gender display item 90 is also depicted in a hypertext mode. Also, informational display item ("RA") 98 of race display item 96 is depicted in a hypertext mode. The informational display item ("PH") 73 of telephone number display item 70 is also depicted in a hypertext mode. The informational display item ("SOC") 84 of social security number display item 82 is also depicted in a hypertext mode.

Figure 4:
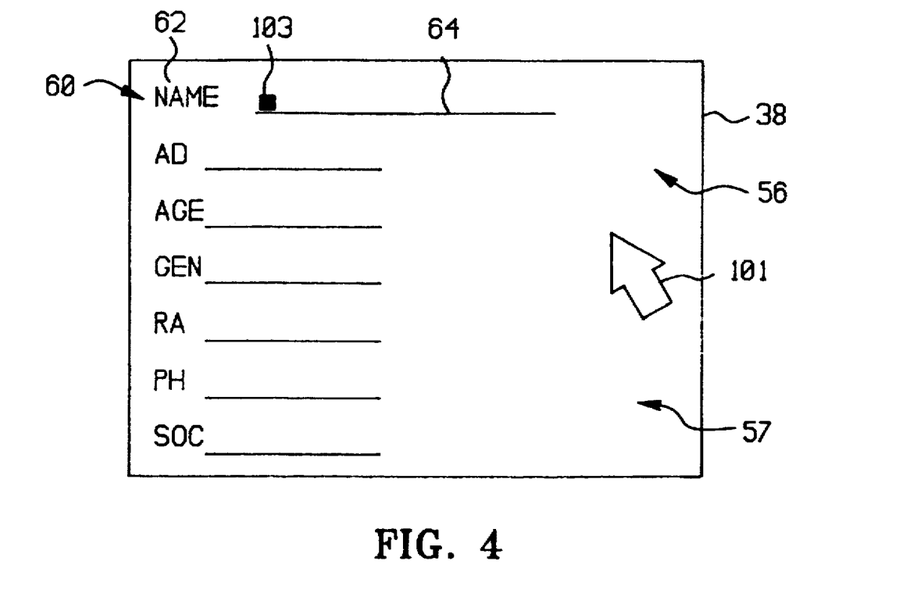
FIGS. 4–9 depict pictorial representations of a particular substitute screen in accordance with the present invention during use.
Figure 5:
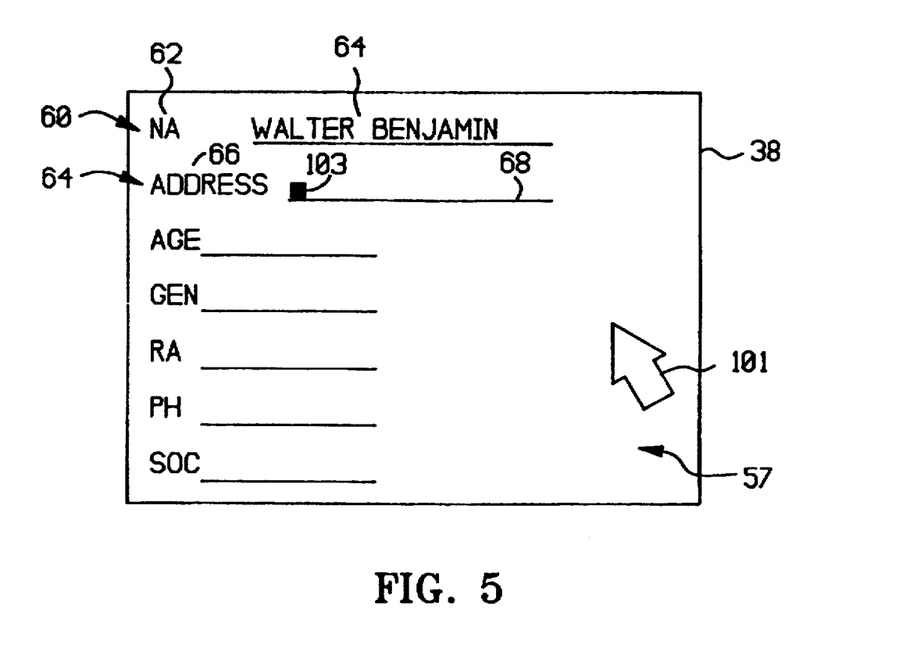

FIGS. 4 through 9 depict utilization of the present invention. With reference to FIG. 4, the application will include application-initiated prompts of the user for entry of particular data. Of course, such prompts are preprogrammed in the application and follow a predetermined programming flow. In the example of FIG. 4, the application has determined that screen 57 has been called for display by the mobile data processing device 32, and that no data has been entered in any of the data fields. Accordingly, the application prompts the operator for entry of data. For example, the name display item 60 may be highlighted in some conventional manner in order to draw attention to it. Additionally, the informational display item 62 will be automatically converted from a hypertext mode of display to a full-text mode of display in order to reinforce the application-generated prompt. The cursor 103 may be located within data entry display area 64. The operator may utilize a keyboard or other conventional means to place data within data entry display area 64. For purposes of illustration, as is shown in FIG. 5, the user has entered the name "Walter Benjamin" within data entry display area 64 of name display item 60. Next, in accordance with preprogrammed flow, the mobile data processing device 32 is utilized to generate the subsequent prompt for address information. For example, the cursor 103 may be relocated to data entry display area 68 of address display item 64. Additionally, the informational display item 66 of address display item 64 may be switched automatically from a hypertext mode of display to a full-text mode of display in order to emphasize the prompt.

As is shown in FIG. 5, after the name information has been entered into the data entry display area 64, the informational display item 60 of name display item 62 is automatically returned to a hypertext mode of display. After the operator has entered the address information in data entry display area 68 of address display item 64, the informational display item 66 will be automatically switched from a full-text display mode to a hypertext display mode in order to conserve space within relatively small display screen 38.

Figure 6:
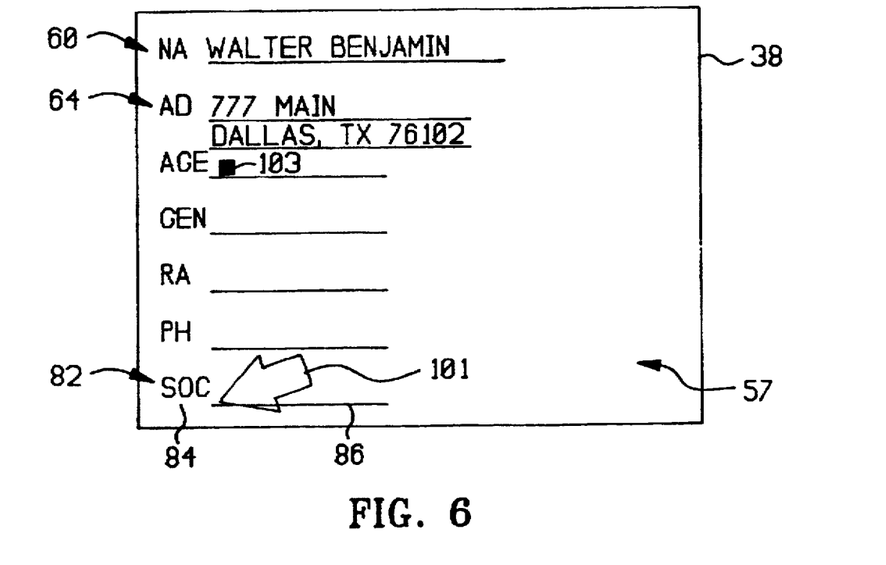

As is shown in FIG. 6, the operator may utilize either the cursor 103 or the graphical pointing device 101 to navigate through screen 57. As is shown in FIG. 6, graphical pointing device 101 is utilized to select the social security number display item 82 for use by the operator. As is shown, social security number display item 82 includes the hypertext informational display item 84 and the full-text data entry display area 86. By operating the graphical pointing device 101 in a conventional manner (such as, pointing and clicking) the operator may move out of the preprogrammed flow of the application and be allowed to enter social number information out of sequence from the preprogrammed flow.

Figure 7:
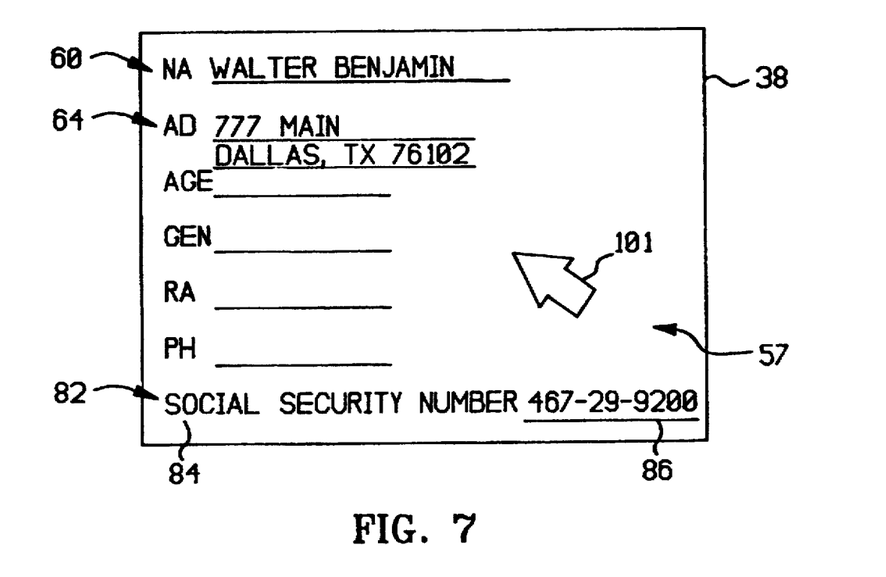

Turning now to FIG. 7, as is shown, the social security number display item 82 has been automatically switched from a hypertext display of the informational display item 84 into a full-text display. The cursor 103 is automatically relocated to the data entry display area 86, and the user may enter the social security number at that time. Since the combined text of the words "Social Security Number" and the social security number exceed 16 characters, the data entry display area 86 is automatically relocated directly below informational display item 84.

Figure 8:
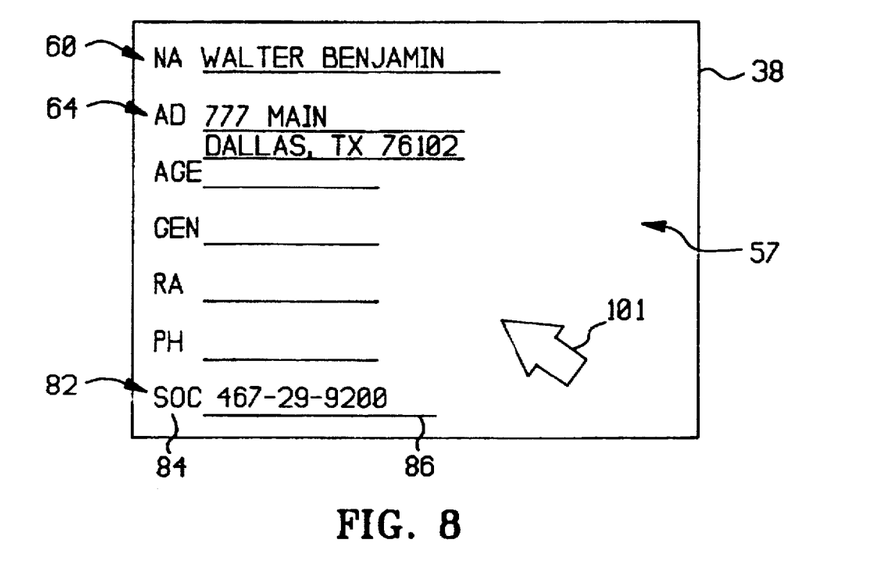

After entry of the social security number information, as is shown in FIG. 8, the informational display item 84 of social security number display item 82 is automatically returned to a hypertext mode of display, and data entry display area 86 can also be relocated.

Figure 9:
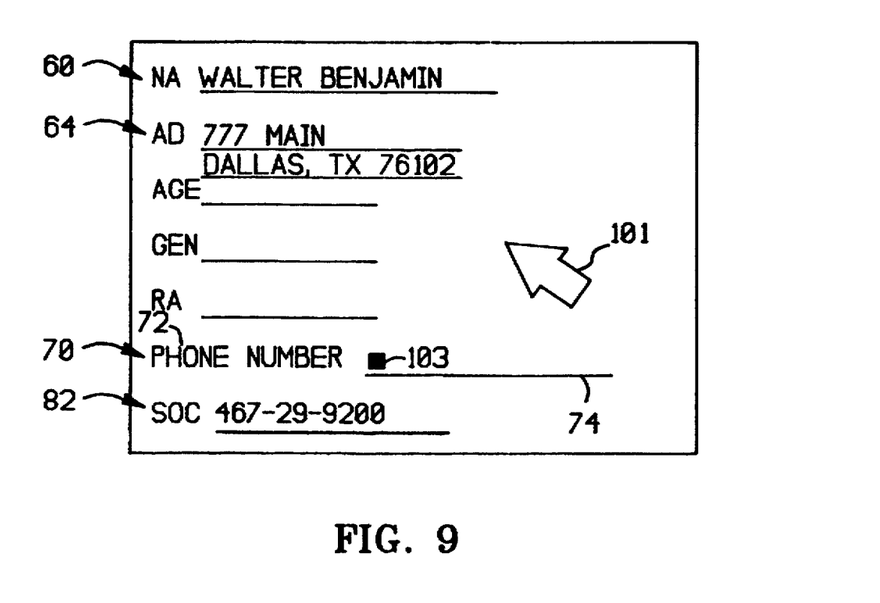

As is shown in FIG. 9, the application may then regain control of the program flow, and automatically prompt the operator for entry of telephone number information by highlighting telephone number informational display item 70, relocating cursor 103 to data entry display area 74, and switching informational display item 72 from a hypertext mode of display to a full-text mode of display to completely reveal the words "PHONE NUMBER".

Figure 10A:
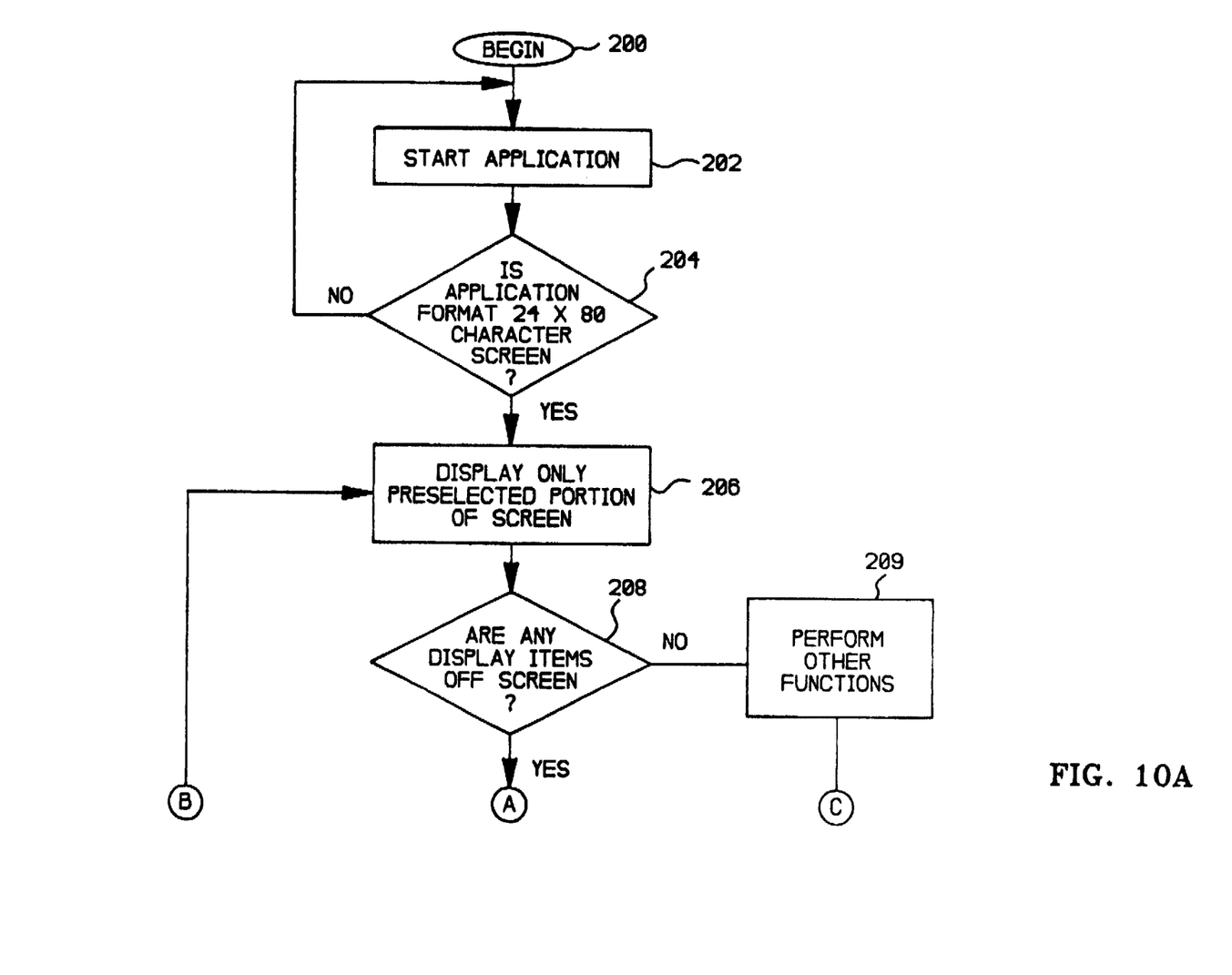
FIGS. 10A to 10B are flowchart representations of the computer program implementation of the method and apparatus of the present invention for facilitating the display of application screens on a relatively small screen of a mobile data processing device.
Figure 10B:
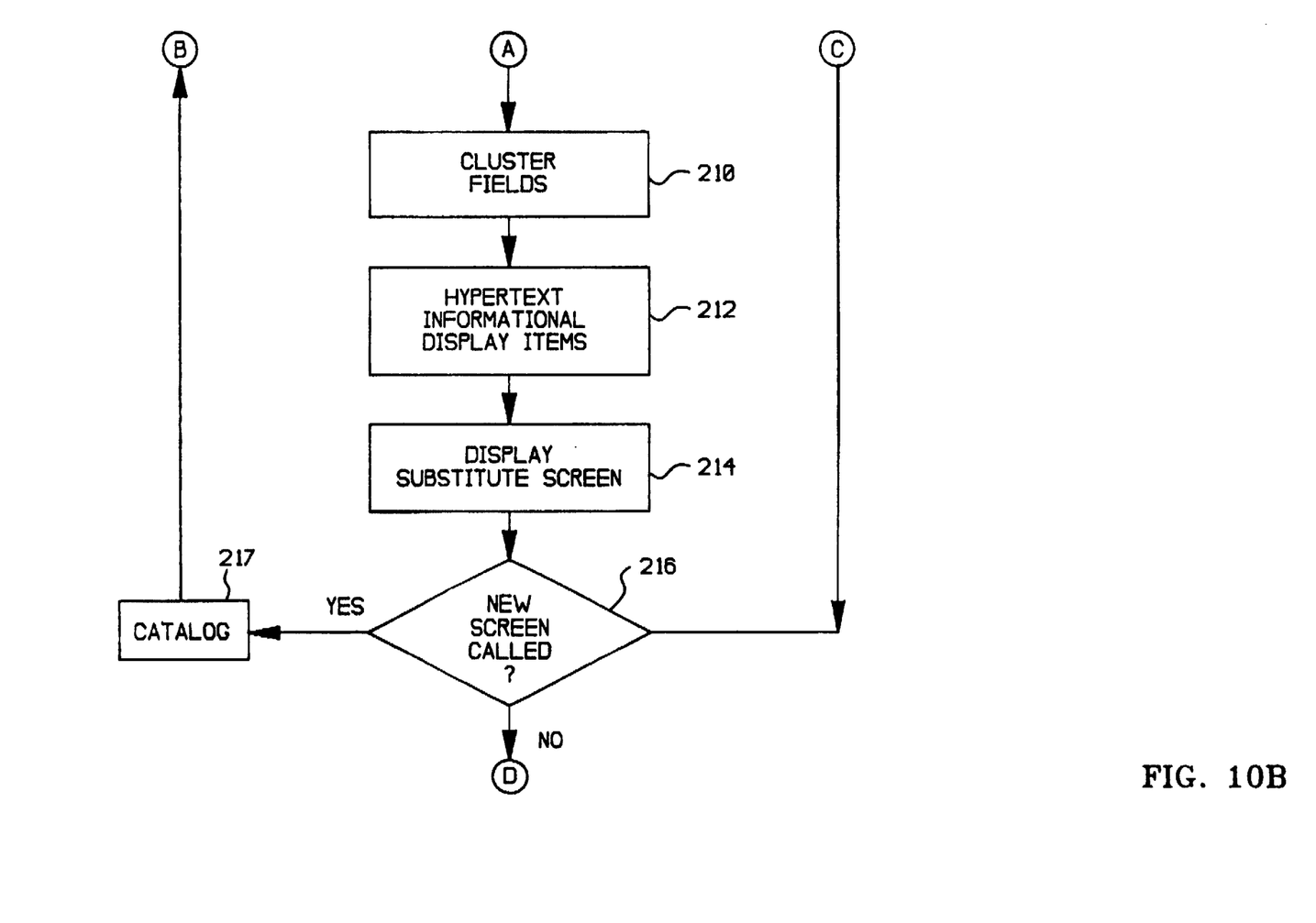
Figure 10C:
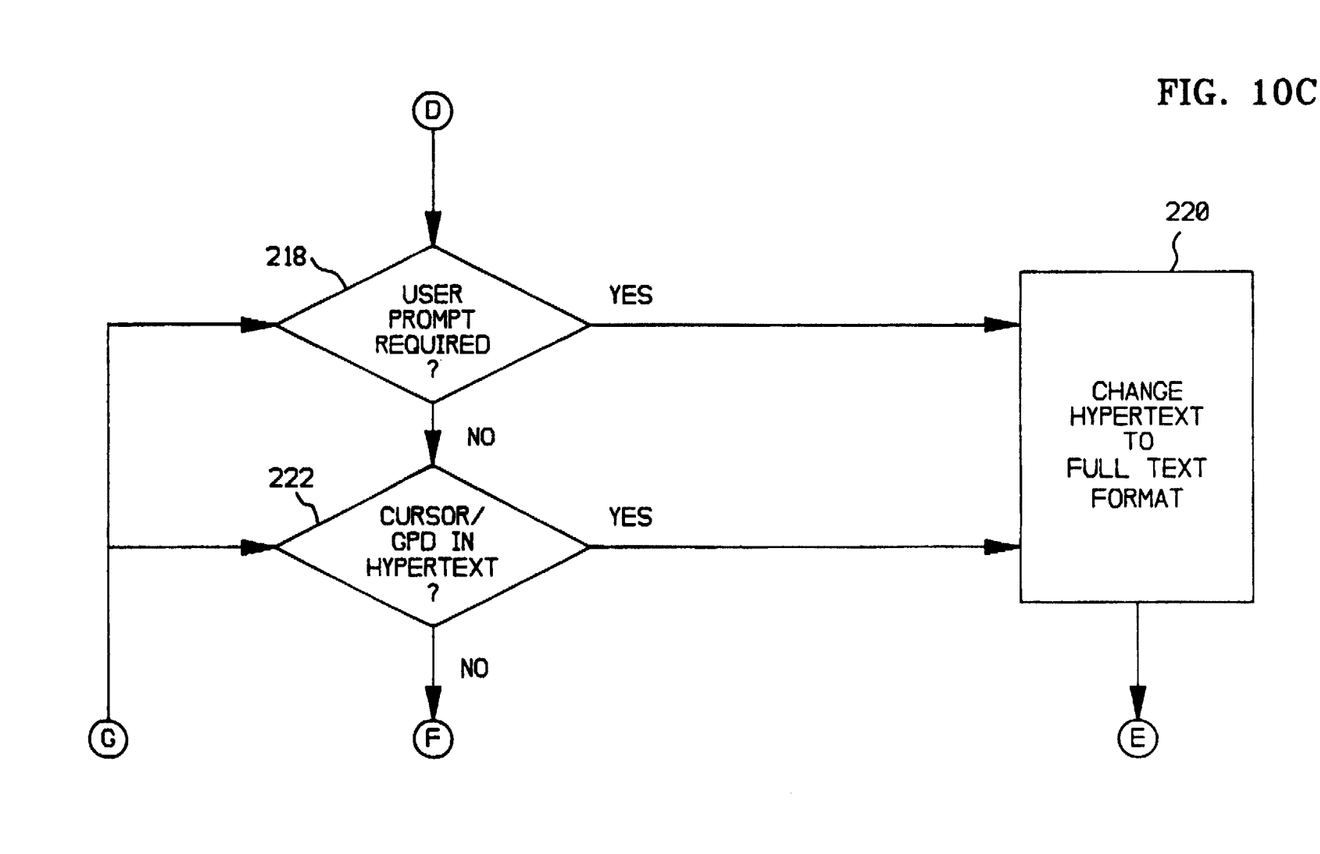
Figure 10D:
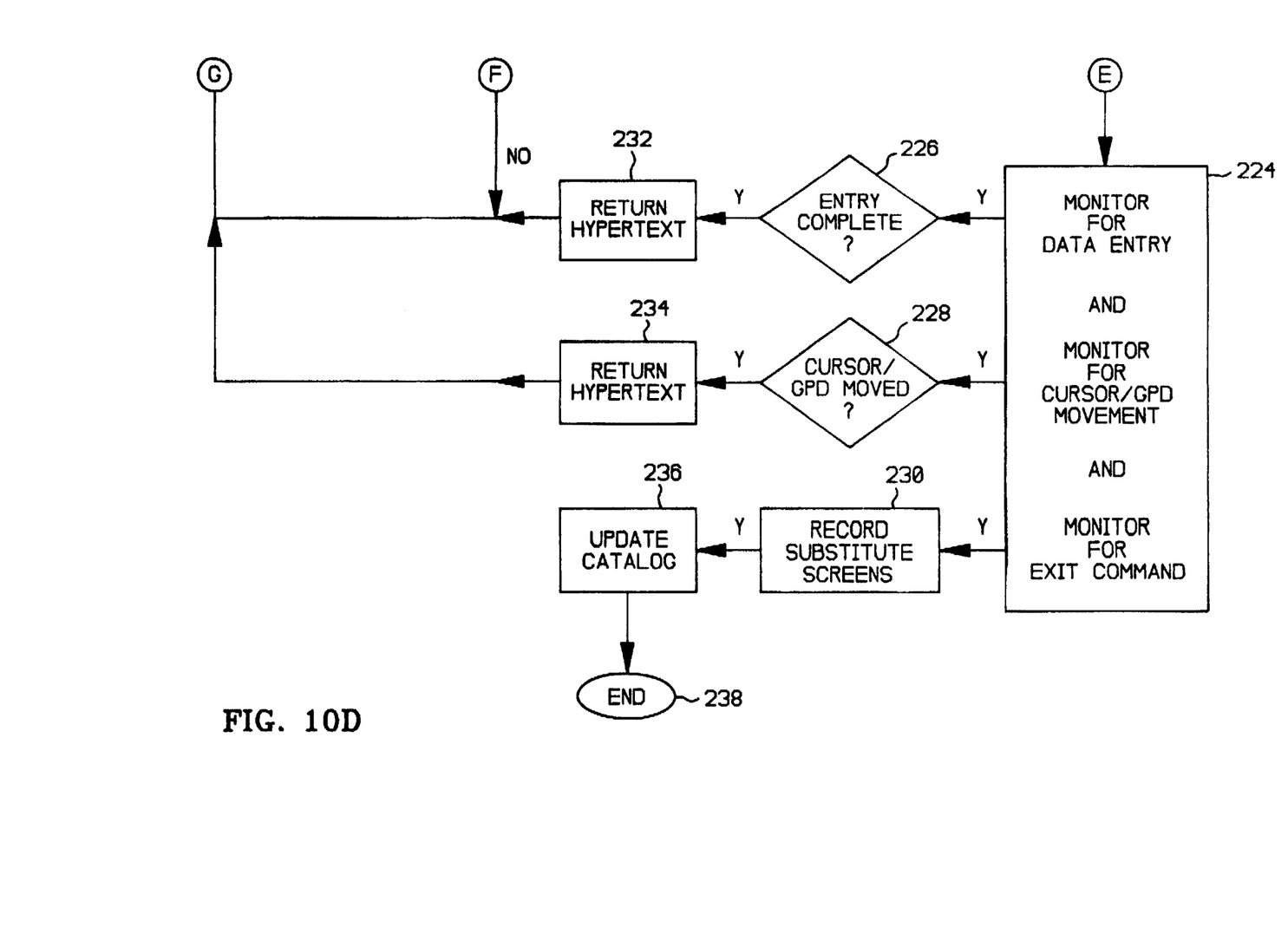

FIGS. 10A to 10D5 are flowchart representations of one particular program which implements the present invention. FIGS. 10A and 10B should be considered as merely exemplary and not limiting of the present invention. The process begins at software block 200 and continues at software block 202, wherein a particular application is started by mobile data processing device 32. In accordance with software block 204, mobile data processing device 32 determines whether the application that has been started is formatted for a 24 by 80 character screen; if not, control returns to software block 202; if so, control passes to software block 206, wherein the relatively small screen of mobile data processing device 32 is utilized to display only a preselected portion of the first screen which is called for display. In accordance with software block 208, mobile data processing device 32 determines whether there are any display items which are "off" the relatively small display screen 38. If not, control passes to software block 209, wherein other requested functions are performed; however, if it is determined that any display item is "offscreen", control passes to software block 210, wherein the display items are clustered more closely together to economize the use of the display area. This clustering is pictorially represented in FIG. 3 and discussed above. Next, control passes to software block 212, wherein mobile data processing device 32 automatically condenses informational display items into a hypertext format. Then, in accordance with software block 214, mobile data processing device 32 automatically displays the substitute screen 57 (of FIG. 3).

Next, in accordance with software block 216, mobile data processing device 32 determines whether a new screen has been called for display; if so, control passes to software block 217, wherein the information necessary for recreating substitute screen 57 is catalogued for future use, and control passes to software block 206 for processing of the new screen; however, if the new screen has not been called, control passes to software block 218, wherein mobile data processing 32 generates user prompts as required by program flow. If no prompts are required, control passes to software block 222, wherein mobile data processing device 32 monitors for movement of either the cursor 103 or the graphical pointing device 101 onto any hypertext display item. If either a user prompt is required, or if the cursor 103 or graphical pointing device 101 is located by the operator on a particular hypertext portion, control passes to software block 220, wherein mobile data processing device 32 changes the pertinent hypertext portion from a hypertext mode of display to a full-text mode of display. Control then passes to software block 224, wherein mobile data processing device 32 monitors for (1) data entry, (2) cursor 103 or graphical pointing device 101 movement, or (3) an exit command generated by the operator.

If data is being entered, control passes to software block 226, wherein mobile data processing device 32 monitors to determine whether the entry has been complete. Entry may be completed in any conventional manner, such as depression of an Enter key or function key. If the movement of cursor 103 or graphical pointing device 101 occurs, control passes to software block 228 wherein the mobile data processing device 32 monitors for movement of the cursor 103 or graphical pointing device 101 away from the hypertext display item; if movement away from the hypertext display item occurs, control passes to software block 234, wherein mobile data processing device 32 automatically returns the previously full-text display to a hypertext mode of display.

If an exit command is selected by the operator, control passes to software block 230, wherein mobile data processing device 32 automatically records the substitute screens in order to allow regeneration of the screens easily. Then, in accordance with software block 236, mobile data processing device 32 updates a catalog of all substitute screens, and the process ends at software block 238.

Figure 11:
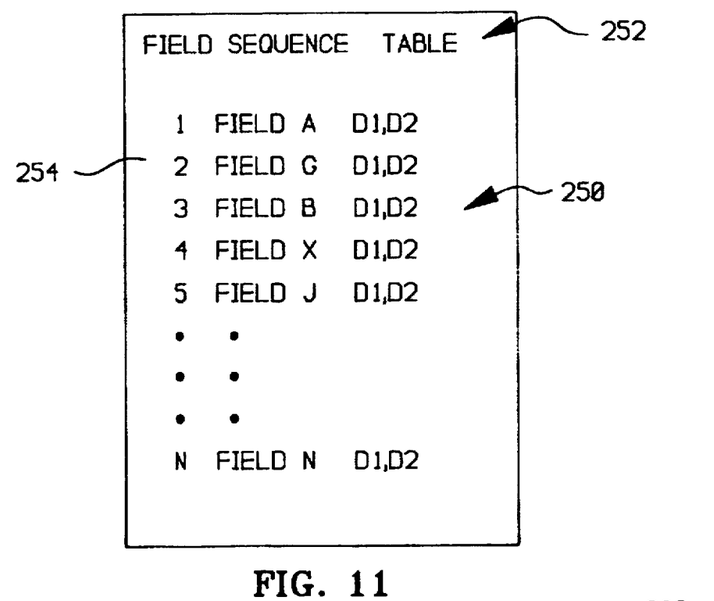
FIG. 11 is a pictorial representation of a screen display table generated by the software in accordance with the present invention in order to determine the content and order of a substitute screen.

FIG. 11 is a pictorial representation of a substitute screen table 250, which includes a title 252 and a listing 254 of the fields by internal program names, and the display variables ("D1", "D2") for each, which identify the location and the mode of display (full-text or hypertext). The substitute screen table 250 may be thereafter utilized by the application to generate more quickly he substitute screen for the screen of the application which is called for display.

Figure 12:
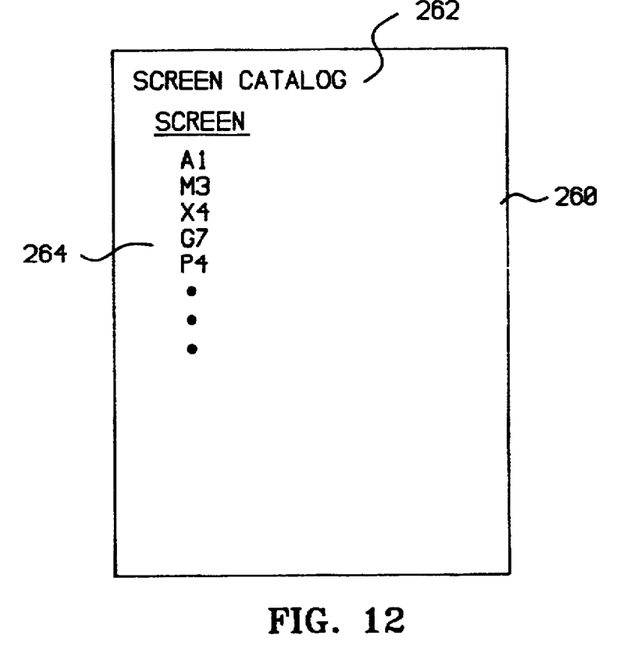
FIG. 12 is a pictorial representation of a screen catalog in accordance with the present invention which develops a record of screens of a particular application which have corresponding substitute screens associated therewith.

FIG. 12 is a graphical depiction of a record which is generated that catalogs the various screens which have been reviewed by the operator, and profiled in a field sequence table. FIG. 12 depicts a screen catalog 260 which includes a title 262 and a plurality of identifiers 264 for the particular screens of the application.

What is claimed is:

1. A method of operating a mobile data processing device with a relatively small display screen to facilitate utilization of an application which includes a plurality of screens which have been written for use in a data processing system having a relatively large display screen, comprising the method steps of:

loading said application into said mobile data processing device;

calling for display at least a portion of a particular one of said plurality of screens of said application on said relatively small display of said mobile data processing device;

determining whether or not display items from said particular one of said plurality of screens cannot be fully displayed within said relatively small display of said mobile data processing device;

if it is determined that said display items from said particular one of said plurality of screens cannot be fully displayed within said relatively small display of said mobile data processing device, automatically generating a substitute screen for said particular one of said plurality of screens of said application which:

(1) relocates said display items to render them visible on said relatively small display of said mobile data processing device; and (2) particular fields of said display items are converted from a full-text display status to a hypertext display status.

2. A method of operating a mobile data processing device according to claim 1, wherein said step of automatically generating a substitute screen comprises:

if it is determined that said display items from said particular one of said plurality of screens cannot be fully displayed within said relatively small display of said mobile data processing device, automatically generating a substitute screen for said particular one of said plurality of screens of said application which:
(1) relocates said display items to render them visible on said relatively small display of said mobile data processing device by closely grouping said display items; and
(2) particular fields of said display items are converted from a full-text display status to a hypertext display status.

3. A method of operating a mobile data processing device according to claim 1, wherein said display items include informational display items and data entry display area, and wherein said step of automatically generating a substitute screen comprises:
if it is determined that said display items from said particular one of said plurality of screens cannot be fully displayed within said relatively small display screen of said mobile data processing device, automatically generating a substitute screen for said particular one of said plurality of screens of said application which:
(1) relocates said display items to render them visible on said relatively small display of said mobile data processing device by closely grouping said display items; and
(2) particular informational display items of said display items converts from a full-text display status to a hypertext display status; and
(3) maintains particular data entry display areas in a full-text display status.

4. A method of operating a mobile data processing device according to claim 1, wherein said display items include informational display items and data entry display area, and wherein said step of automatically generating a substitute screen comprises:
if it is determined that said display items from said particular one of said plurality of screens cannot be fully displayed within said relatively small display of said mobile data processing device, automatically generating a substitute screen for said particular one of said plurality of screens of said application which:
(1) relocates said display items to render them visible on said relatively small display of said mobile data processing device by closely grouping said display items; and
(2) converts particular informational display items of said display items from a full-text display status to a hypertext display status; and
(3) maintains particular data entry display areas in a full-text display status.
and wherein said method further includes:
automatically switching said particular informational display items between a hypertext display status and a full-text display status upon occurrence of one of the following:
(1) said application determines that a user prompt for a particular informational display item is required; and
(2) said application determines that a particular predetermined operator input has occurred.

5. A method of operating a mobile data processing device according to claim 4, wherein said particular predetermined operator input comprises at least one of:
(1) operator location of a cursor on a portion of said relatively small display associated with said particular informational display item; and
(2) operator location of a graphical pointing device on a portion of said relatively small display associated with said particular informational display item.

6. A method of operating a mobile data processing device according to claim 4, further comprising:
automatically switching said particular informational display item between a full-text display status to a hypertext display status upon occurrence of one of the following:
(1) said application determines that another and different user prompt for another and different informational display item is required; and
(2) said application determines a particular predetermined operator input has occurred.

7. A method of operating a mobile data processing device according to claim 6, wherein said particular predetermined operator input comprises at least one of:
(1) operator location of a cursor on a portion of said relatively small display associated with said particular informational display item; and
(2) operator location of a graphical pointing device on a portion of said relatively small display associated with said particular informational display item.

8. An improved mobile data processing device with a relatively small display which is adapted to utilize an application which includes a plurality of screens which have been written for use in a data processing system having a relatively large display screen, comprising:
means for determining if a particular one of said plurality of screens of said application which is called for display has been written for use in a data processing system having a relatively large display;
means for displaying at least a portion of said particular one of said plurality of screens of said application on said relatively small display of said mobile data processing device;
means for determining whether or not display items from said particular one of said plurality of screens cannot be fully displayed within said relatively small display of said mobile data processing device;
means for automatically generating a substitute screen for said particular one of said plurality of screens of said application which:
(1) relocates said display items to render them visible on said relatively small display of said mobile data processing device; and
(2) converts particular fields of said display items from a full-text display status to a hypertext display status.

9. An improved mobile data processing device according to claim 8, wherein said means for automatically generating comprises:
means for automatically generating a substitute screen for said particular one of said plurality of screens of said application which:
(1) relocates said display items to render them visible on said relatively small display screen of said mobile data processing device by closely grouping said display items; and
(2) converts particular fields of said display items from a full-text display status to a hypertext display status.

10. An improved mobile data processing device according to claim 8, wherein said display items include informational display items and data entry display areas, and wherein said means for automatically generating comprises:
means for automatically generating a substitute screen for said particular one of said plurality of screens of said application which:

(1) relocates said display items to render them visible on said relatively small display of said mobile data processing device by closely grouping said display items; and (2) converts particular informational display items of said display items from a full-text display status to a hypertext display status; and (3) maintains particular data entry display areas in a full-text display status.

11. An improved mobile data processing device according to claim 8, wherein said display items include informational display items and data entry display areas, and wherein said means for automatically generating comprises:

means for automatically generating a substitute screen for said particular one of said plurality of screens of said application which:
(1) relocates said display items to render them visible on said relatively small display of said mobile data processing device by closely grouping said display items; and
(2) converts particular informational display items of said display items from a full-text display status to a hypertext display status; and
(3) maintains particular data entry display areas in a full-text display status and wherein said method further includes:

means for automatically switching said particular informational display items between a hypertext display status and a full-text display status upon occurrence of one of the following:
(1) said application determines that a user prompt for a particular informational display item is required; and
(2) said application determines a particular predetermined operator input has occurred.

12. An improved mobile data processing device according to claim 11, wherein said particular predetermined operator input comprises at least one of:

(1) operator location of a cursor on a portion of said relatively small display associated with said particular informational display item; and (2) operator location of a graphical pointing device on a portion of relatively small display associated with said particular informational display item.

13. An improved mobile data processing device according to claim 11, further comprising:

means for automatically switching said particular informational display items from a full-text display status to a hypertext display status upon occurrence of one of the following:
(1) said application determines that another and different user prompt for another and different informational display item is required; and
(2) said application determines a particular predetermined operator input has occurred.

* * * * *